(12) United States Patent
Todoroff et al.

(10) Patent No.: US 7,297,912 B1
(45) Date of Patent: Nov. 20, 2007

(54) CIRCUIT AND METHOD FOR REDUCING POWER CONSUMPTION IN AN OPTICAL NAVIGATION SYSTEM HAVING REDUNDANT ARRAYS

(75) Inventors: Brian D. Todoroff, San Jose, CA (US); Yansun Xu, Mountain View, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 115 days.

(21) Appl. No.: 11/389,903

(22) Filed: Mar. 27, 2006

(51) Int. Cl.
*G01J 1/32* (2006.01)

(52) U.S. Cl. ............... 250/205; 250/208.1; 250/221

(58) Field of Classification Search ............. 250/221, 250/208.1, 235, 205, 559.32, 214 R; 235/462.06, 235/455; 345/163, 157, 166, 167
See application file for complete search history.

(56) References Cited

U.S. PATENT DOCUMENTS

| | | | |
|---|---|---|---|
| 3,922,093 A | 11/1975 | Dandikar et al. | |
| 4,546,347 A | 10/1985 | Kirsch | |
| 4,799,055 A | 1/1989 | Nestler et al. | |
| 5,288,993 A | 2/1994 | Bidiville et al. | |
| 5,473,344 A | 12/1995 | Bacon et al. | |
| 5,578,813 A | 11/1996 | Allen et al. | |
| 5,644,139 A | 7/1997 | Allen et al. | |
| 5,703,356 A | 12/1997 | Bidiville et al. | |
| 5,729,008 A | 3/1998 | Blalock et al. | |
| 5,729,009 A | 3/1998 | Dandliker et al. | |
| 5,786,804 A | 7/1998 | Gordon | |
| 5,825,044 A | 10/1998 | Allen et al. | |
| 5,854,482 A | 12/1998 | Bidiville et al. | |
| 5,907,152 A | 5/1999 | Dandliker et al. | |
| 5,963,197 A | 10/1999 | Bacon et al. | |
| 5,994,710 A | 11/1999 | Knee et al. | |
| 6,031,218 A | 2/2000 | Piot et al. | |
| 6,034,379 A * | 3/2000 | Bunte et al. | ................. 250/566 |
| 6,037,643 A | 3/2000 | Knee | |
| 6,057,540 A | 5/2000 | Gordon et al. | |
| 6,097,371 A | 8/2000 | Siddiqui et al. | |
| 6,151,015 A | 11/2000 | Badyal et al. | |
| 6,172,354 B1 | 1/2001 | Adan et al. | |
| 6,225,617 B1 | 5/2001 | Dandliker et al. | |
| 6,233,368 B1 | 5/2001 | Badyal et al. | |
| 6,281,881 B1 | 8/2001 | Siddiqui et al. | |
| 6,281,882 B1 | 8/2001 | Gordon et al. | |
| 6,326,950 B1 | 12/2001 | Liu | |
| 6,330,057 B1 | 12/2001 | Lederer et al. | |
| 6,351,257 B1 | 2/2002 | Liu | |

(Continued)

*Primary Examiner*—Que T Le
(74) *Attorney, Agent, or Firm*—William E. Nuttle

(57) ABSTRACT

A circuit and method are provided for reducing power consumption in an optical navigation system for use in an input device to sense displacement of the device relative to a surface. Generally, the system includes: (i) an optical sensor having at least first and second arrays of photosensitive elements; (ii) imaging optics to map an illuminated portion of the surface to the optical sensor; (iii) a signal processor including a first and second sensor circuits coupled to the respective first and second arrays to generate from each array a set of signals in response to motion of light received thereon; and (iv) a control circuit capable of independently switching power to the sensor circuits. In one embodiment, the control circuit powers down one sensor circuit when the strength of the set of signals from the other is greater than a predetermined minimum thereby maintaining device performance. Other embodiments are also disclosed.

20 Claims, 5 Drawing Sheets

U.S. PATENT DOCUMENTS

| | | |
|---|---|---|
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,621,483 B2 | 9/2003 | Wallace et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |

* cited by examiner

CIRCUIT AND METHOD FOR REDUCING POWER CONSUMPTION IN AN OPTICAL NAVIGATION SYSTEM HAVING REDUNDANT ARRAYS

TECHNICAL FIELD

The present invention relates generally to optical navigation systems, and more particularly to a circuit and method for use with an optical navigation system having redundant array to reduce power consumption therein.

BACKGROUND OF THE INVENTION

Optical navigation systems used in devices, such as an optical computer mouse, trackball or touch pad, are well known for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse. Alternatively, movement of the hand over a stationary device may be used for the same purpose.

One technology used for optical mice today relies on a light source illuminating a surface, and a two-dimensional (2D) array of photosensitive elements or detectors, such as photodiodes, in which the output of the individual elements in the array are combined or wired together in a repeating pattern spanning two or more detectors to track motion along one axis or in one dimension. Generally, the detectors are wired in groups to detect of motion through movement of a light-dark pattern known as speckle. Speckle is the complex interference pattern generated by scattering of coherent light off of an optically rough surface and detected by a photosensitive element, such as a photodiode, with a finite angular field-of-view or numerical aperture. The image mapped to or captured on the comb-array may be magnified or de-magnified to achieve matching and so that the distribution of spatial frequencies in the image is roughly centered around the spatial frequencies of the array. Through use of signal processing, it is possible to track the movement of this image as it moves back and forth across the comb-array and from that tracking derive the motion of the surface relative to the array.

Although a significant improvement over prior art, these speckle-based devices have not been wholly satisfactory for a number of reasons. In particular, optical navigation systems using the above comb-detector array are subject to signal fading from time to time and location to location within the image incident on the array. By fading it is meant that contrast of the received speckle pattern drops below a level that can be accurately detected by the array. When this happens, the estimation of displacements become erratic and unreliable, hence affecting the overall performance of the optical navigation system.

Accordingly, there is a need for a signal processor or signal processing circuit and method that minimizes the impact of signal fading on the overall performance of the system. It is desirable that the circuit and method achieve this end without increasing the complexity and power consumption of the signal processor or the optical navigation system in which it is used. It is still further desirable that the method reduces the power consumption of the system, thereby making it more suitable for power sensitive applications such as wireless mice.

The present invention provides a solution to this and other problems, and offers further advantages over conventional optical navigation systems.

BRIEF DESCRIPTION OF THE DRAWINGS

These and various other features and advantages of the present invention will be apparent upon reading of the following detailed description in conjunction with the accompanying drawings and the appended claims provided below, where:

DETAILED DESCRIPTION

The present invention is directed generally to optical navigation systems and more particularly to a control circuit and method for use with an optical navigation system having redundant arrays to reduce power consumption therein.

Optical navigation systems can include, for example, an optical computer mouse, trackballs and the like, and are well known for inputting data into and interfacing with personal computers and workstations. For purposes of clarity, many of the details of optical navigation systems in general and optical sensors for optical navigation systems in particular that are widely known and are not relevant to the present invention have been omitted from the following description. Optical navigation systems and optical sensors are described, for example, in co-pending, commonly assigned U.S. patent application Ser. No. 11/355,551, entitled, "Circuit and Method for Determining Motion with Redundant Comb-Array," filed on Feb. 16, 2006 by Yansun Xu et al., and incorporated herein by reference in its entirety.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "one embodiment" in various places in the specification do not necessarily all refer to the same embodiment. The term "to couple" as used herein may include both to directly connect and to indirectly connect through one or more intervening components.

Optical Navigation Systems

Figure 1:
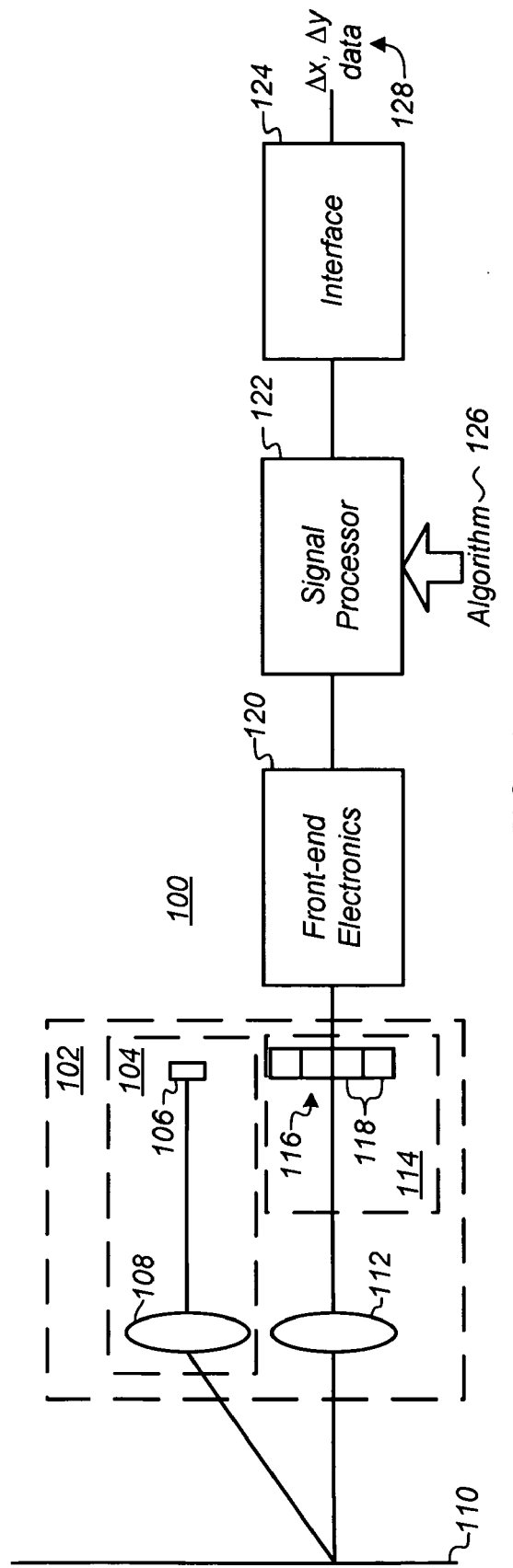
FIG. 1 is a functional block diagram of a speckle-based optical navigation system for which a circuit and method according to the present invention is particularly useful.

Operating principles of speckle-based optical navigation system will now be described with reference to FIG. 1. FIG. 1 is a functional block diagram of one embodiment of an optical navigation system for which the control circuit and method of the present invention is particularly useful. Referring to FIG. 1, an optical navigation system 100 generally includes an optical head 102 having an illuminator 104 with a light source 106 and illumination optics 108 to illuminate a portion of a surface 110, imaging optics 112 to map or image a pattern of the by the surface, and an optical sensor 114 to sense or detect change in the pattern. The optical sensor 114 includes one or more one-dimensional (1D) or two-dimensional (2D) arrays 116 each having a number of photosensitive elements, such as photodiodes 118, on which light reflected from the surface 110, is received. The array(s) 116 may be configured to provide displacement measurements along any number of axes, for example along two orthogonal axes, x and y. The optical navigation system 100 further includes front-end electrics 120, signal processor 122, and interface circuitry 124. In one embodiment, groups of photodiodes 118 in the array(s) 116 may be combined using passive electronic components in the front-end electrics 120 to produce group signals. These group signals may be subsequently algebraically combined by the signal processor 122 using an algorithm 126 to produce to produce a signal providing information on the magnitude and direction of displacement of the sensor 114 in x and y directions. The signal may be converted by the interface circuitry 124 to produce Δx, Δy data 128 which may be output by the system 100.

Generally, the circuit and method of the present invention is applicable to both speckle and non-speckle based optical sensors having either multiple 1D arrays or 2D arrays. The 2D array may be either a periodic, 2D comb-array, which includes a number of regularly spaced photosensitive elements having 1D or 2D periodicity, a quasi-periodic 2D array (such as one having Penrose tiling), or a non-periodic 2D array, which has a regular pattern but does not include periodicities.

Figures 2A, 2B:
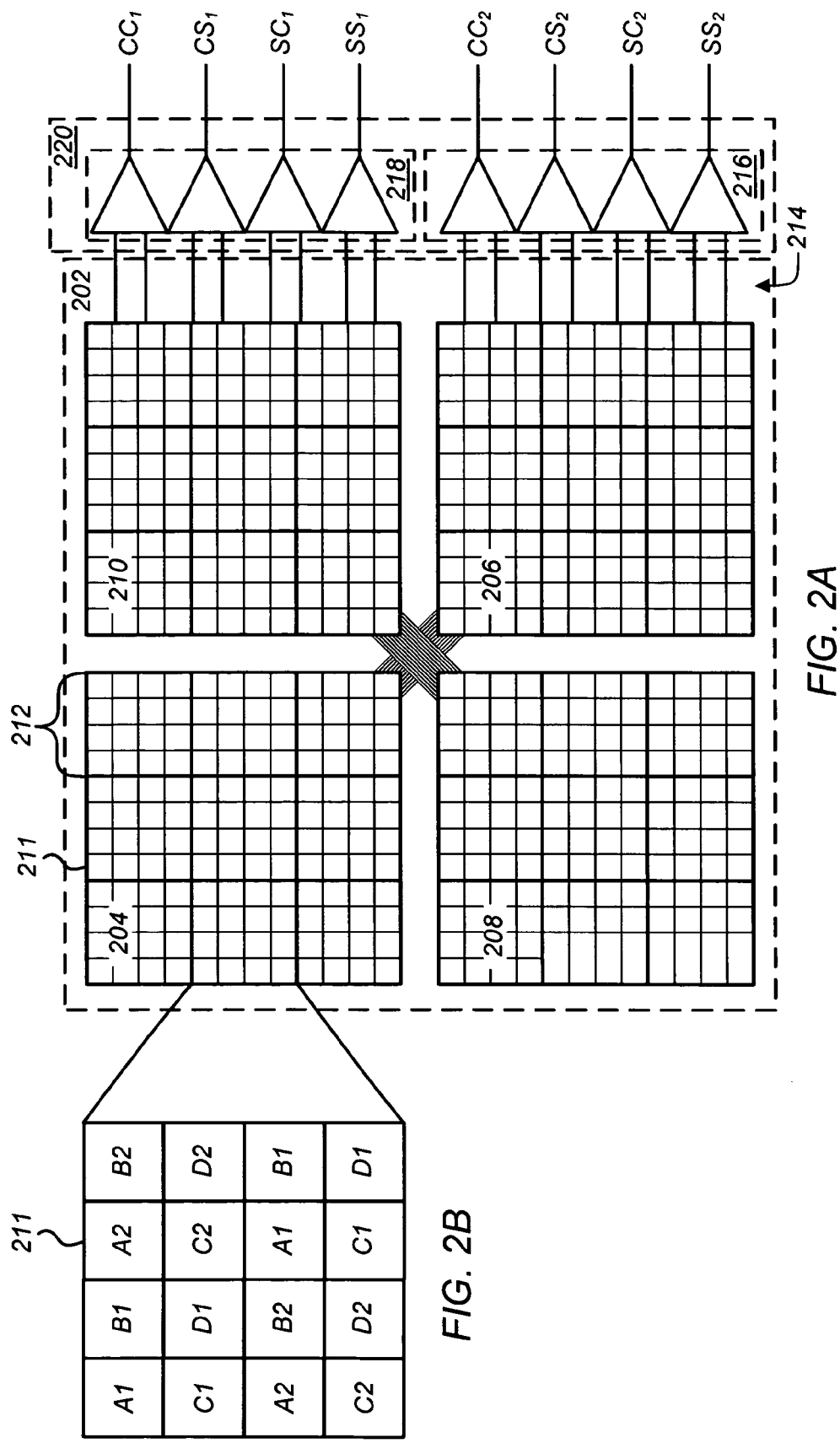
FIGS. 2A and 2B are schematic block diagrams of two redundant 2D comb-arrays arranged in quadrants according to an embodiment of the present invention.

In a preferred embodiment the optical sensor is a speckle based optical sensor including redundant 2D comb-arrays of detectors or photosensitive elements arranged in two dimensions as shown in FIGS. 2A and 2B. The 2D comb-array offers a simplicity of design and several further advantages over the conventional, non-speckle based or correlation sensors including: (i) faster signal processing; (ii) reduced power consumption; (iii) high angular accuracy; and (iv) performance that is independent of a direction of movement relative to an array orientation.

FIGS. 2A and 2B are schematic block diagrams of an optical sensor 202 having two redundant 2D comb-arrays or array-pairs arranged in quadrants 204, 206, 208 and 210 according to an embodiment of the present invention. Diagonally opposing quadrants 204 and 206 are connected and form a first single array-pair or first 2D comb-array. Opposing quadrants 208 and 210 are connected and form a second single array-pair or second 2D comb-array.

Referring to FIGS. 2A and 2B, each quadrant or sub-array 204, 206, 208 and 210 has multiple photosensitive elements 211 arranged or grouped into cells 212, each cell having photosensitive elements grouped in a 4×4 elements-per-cell (or 4×4 elements/period) configuration. Photosensitive elements 211 within a cell 212 with the same letter and same number, as shown in the detail of FIG. 2B, as well as corresponding elements of all cells in an array-pair (204 and 206, or 208 and 210) with the same letter and number, are electrically connected or wired-sum to yield sixteen (16) wired-sum signals 214. The 16 wired-sum signals 214 are further combined with analog sensor circuits 216 and 218 in the signal processor 220 to produce eight (8) signals, CC1, CS1, SC1, SS1 from the first 2D comb-array, and CC2, CS2, SC2, SS2 from the second 2D comb-array. In operation, the strengths of the signals from either of the 2D comb-arrays or array-pairs may decrease because the selected spatial frequency component is weak at some particular location on the surface, or because contributions from various parts of the array add coherently to zero. However, it will be appreciated that fading in any one array-pair is unlikely to result in fading in the other pair, therefore such a multiple array or sub-array configuration is often desirable to mitigate signal fading. Moreover, the square symmetry arrangement of the optical sensor 202 enables simple and efficient illumination of all photosensitive elements 211 in the optical sensor.

Although the detector or photosensitive elements shown in FIGS. 2A and 2B are equal in size and square, it will be understood that this is a particular embodiment of a 2D comb-array which is not necessary to practice the invention.

Signal Processing

A signal processing method for combining the motion data derived from the redundant arrays or array-pairs to minimize the impact of signal fading on the overall performance of the system will now be described in detail with reference to FIGS. 2A and 2B.

The image captured on the 2D comb-array of FIGS. 2A and 2B is (de-)magnified such that the spatial frequency distribution of the image is roughly centered around the spatial frequency of the detector array. Through the processing of the four quasi-sinusoidal outputs (CC, CS, SC, and SS) representing separate in-phase and quadrature signals for motion along two orthogonal axes, it is possible to track the 2D movement of the image as it moves across the detector array and derive the motion of the surface relative to the detector array along the two orthogonal axes. For a 2D motion, the phase angle value in an x direction, $\emptyset_x$, can be computed using equation 1.0 shown below.

$$\phi_x = \tan^{-1}\left(\frac{Q}{I}\right) = \tan^{-1}\left(\frac{CS+SC}{CC-SS}\right) \quad (1.0)$$

where $\emptyset_x$ is the phase angle value in the x direction, and CC, CS, SC, and SS are the four quasi-sinusoidal output signals from the array shown in FIG. 2A and described above.

The phase angle value in a y direction, $\emptyset_y$, can be computed similarly using equation 2.0 shown below.

$$\phi_y = \tan^{-1}\left(\frac{CS-SC}{CC+SS}\right) \quad (2.0)$$

The velocity of the movement of the sensor relative to the surface can now be determined by tracking the phase angle changes over time, that is from frame to frame using the following equation:

$$\text{Velocity} = \left(\frac{\Delta\phi}{\Delta t}\right) \quad (3.0)$$

The phase angle changes $\Delta\emptyset_x$ and $\Delta\emptyset_y$ represent the movement of an image across the detector in 2D. For the 2D comb-array shown in FIGS. 2A and 2B, the phase angle changes $\Delta\emptyset_x$ and $\Delta\emptyset_y$ from the previous sample frame are proportional to the detected 2D displacements along the two orthogonal axes between the current and previous sample frames. Note also, because $\Delta t$ or the sampling rate is constant velocity is proportional to $\Delta\emptyset$. Accordingly, the terms velocity and $\Delta\emptyset$ are used interchangeably throughout the remainder of this description.

Optionally, at each sample frame radius values $R_x$ and $R_y$ are computed as well as phase angle values $\emptyset_x$ and $\emptyset_y$ using the following equations:

$$R_x = \sqrt{(CC-SS)^2 + (CS+SC)^2} \quad (4.0)$$

$$R_y = \sqrt{(CC+SS)^2 + (CS-SC)^2} \quad (5.0)$$

$R_x$ and $R_y$ indicate the contrast of the detected quasi-sinusoidal signals, and can be used as weighting factors in average velocity calculations and/or as an indication of quality of the received signal.

At each sample frame, phase angle values $\emptyset_x$ and $\emptyset_y$ as well as radius values $R_x$ and $R_y$ are computed. $R_x$ and $R_y$ indicate the contrast of the detected quasi-sinusoidal signals. The phase angle changes $\Delta\emptyset_x$ and $\Delta\emptyset_y$ are proportional to the 2D displacements along the two orthogonal axes. $\Delta\emptyset_x$ and $\Delta\emptyset_y$ are computed from the phase angle values for two successive frames using the following equations:

$$\Delta\phi_x = \phi_{x,i} - \phi_{x,i-1} \text{ where } \phi_{x,i} = \tan^{-1}\left(\frac{CS_i + SC_i}{CC_i - SS_i}\right) \quad (6.0)$$

$$\Delta\phi_y = \phi_{y,i} - \phi_{y,i-1} \text{ where } \phi_{y,i} = \tan^{-1}\left(\frac{CS_i - SC_i}{CC_i + SS_i}\right) \quad (7.0)$$

Due to the mathematical nature of the inverse tangent function (i.e., $\tan(\emptyset)=\tan(\emptyset+2\pi N)$), where N is a whole number greater than or equal to 1, the computed phase angles $\emptyset_x$ and $\emptyset_y$ are always wrapped within the range of $[-\pi, +\pi]$. Thus, to compute the correct 2D displacements ($\Delta\Phi_x$ and $\Delta\Phi_y$) between two successive frames, the phase angle changes $\Delta\emptyset_x$ and $\Delta\emptyset_y$ need to be unwrapped to account for any additional full $2\pi$ rotations that may have occurred between the two sample frames.

In a preferred embodiment unwrapping is accomplished using a velocity predictor as described, for example, in co-pending, commonly assigned U.S. patent application Ser. No. 11/324,424, entitled, "Method For Determining Motion Using A Velocity Predictor," filed on Jan. 3, 2006 by Yansun Xu et al., and incorporated herein by reference in its entirety.

A method for detecting motion of an optical sensor relative to a surface using unwrapped phase angle changes ($\Delta\Phi_{x1}$, $\Delta\Phi_{x2}$) and radius-weighted-averaging will now be described. Briefly, the method involves: (i) generating for each array a first set of quasi-sinusoidal signals (CC, CS, SC, and SS) at a first time and a second set of quasi-sinusoidal signals at a second time in response to motion of light in at least a first direction (x) received thereon (ii) computing from the first and second sets of quasi-sinusoidal signals from each of the arrays phase angle changes ($\Delta\emptyset_{x1}$, $\Delta\emptyset_{x2}$) for the first and second sets of quasi-sinusoidal signals received from each of the arrays; (iii) computing from the first and second sets of quasi-sinusoidal signals from each of the arrays radius values ($R_{x1}$, $R_{x2}$) for the first and second sets of quasi-sinusoidal signals received from each of the arrays; (iv) computing unwrapped phase angle changes ($\Delta\Phi_{x1}$, $\Delta\Phi_{x2}$) for the first and second sets of quasi-sinusoidal signals received from each of the arrays using velocity predictor; combining the unwrapped phase angle changes ($\Delta\Phi_{x1}$, $\Delta\Phi_{x2}$) for each of the arrays using radius-weighted-averaging to provide a single weighted average unwrapped phase angle change ($\Delta\Phi_x$) resulting from the motion in the first direction.

Preferably, the velocity predictors are computed using average velocity values (unwrapped average phase angle changes) from K preceding successive frames by: (i) calculating the number of full $2\pi$ rotations needed to unwrap the phase angle changes for each direction using the current velocity predictors; and (ii) computing the unwrapped or corrected phase angle changes. This correction or unwrapping is expressed mathematically in the following equations:

$$\Delta\Phi_x = \Delta\phi_x - 2\pi \times \text{INTEGER}\left(\frac{\Delta\phi_x - \langle\Delta\Phi_x\rangle + \pi}{2\pi}\right) \quad (8.0)$$

$$\Delta\Phi_y = \Delta\phi_y - 2\pi \times \text{INTEGER}\left(\frac{\Delta\phi_y - \langle\Delta\Phi_y\rangle + \pi}{2\pi}\right) \quad (9.0)$$

where the INTEGER function takes the largest integer value that is not greater than its argument, and $\langle\Delta\Phi_x\rangle$ and $\langle\Delta\Phi_y\rangle$ are the average phase angle changes (unwrapped) along the X and Y axes between two successive frames (i.e., the average velocities) over the past K frames. The average velocities, also known as velocity predictors, are expressed mathematically in the following equations:

$$\langle\Delta\Phi_x\rangle = \frac{1}{K}\sum_{j=1}^{K} \Delta\Phi_{x,(i-j)} \quad (10.0)$$

$$\langle\Delta\Phi_y\rangle = \frac{1}{K}\sum_{j=1}^{K} \Delta\Phi_{y,(i-j)} \quad (11.0)$$

The unwrapped or corrected phase angle changes for each direction are then combined to produce a single value in which the effect of signal fading on motion detection is mitigated. In a preferred embodiment the combining of motion data is accomplished as described, for example, in co-pending, commonly assigned U.S. patent application Ser. No. 11/355,551, entitled, "Circuit and Method for Determining Motion with Redundant Comb-Arrays," filed on Feb. 16, 2006 by Yansun Xu et al., and incorporated herein by reference in its entirety.

Generally, the method involves using the radius values as weighting coefficients when combining the motion data derived from the two detector arrays. In particular, taking $\Delta\Phi_{x1}$ and $\Delta\Phi_{y1}$ are the corrected (unwrapped) phase angle changes between two successive frames for a first comb-array (array #1), and $\Delta\Phi_{x2}$ and $\Delta\Phi_{y2}$ for a second comb-array (array #2), the estimated 2D displacements, $\Delta\Phi_x$ and $\Delta\Phi_y$, for the multi-detector-array system shall be derived from some combination of $\Delta\Phi_{x1}$ and $\Delta\Phi_{x2}$, and of $\Delta\Phi_{y1}$ and $\Delta\Phi_{y2}$. We know that the radius data, $R_x$ and $R_y$, derived from the quasi-sinusoidal signals (CC, CS, SC and SS) are good indicators of speckle signal contrast or strength. A small radius value indicates low speckle contrast, i.e., the signal is fading. By using the radius values as weighting coefficients when combining the motion data derived from the two detector arrays, we can effectively reduce the impact of an erratic phase calculation due to signal fading on the final 2D displacement estimation.

Unfortunately, dual or redundant comb-arrays consume roughly twice as much power to drive dual amplification stages and additional analog-to-digital conversion (ADC) cycles. Since the analog circuitry makes up a significant percentage of the power consumption, this doubling is a serious problem for power sensitive applications.

Control Circuit and Method for Reducing Power Consumption

One method to reduce the power consumption of an optical navigation system using the above described optical sensor is to eliminate the redundancy provided by one of the redundant arrays. This cuts the analog current consumption nearly in half; however, the system is now less accurate. This would be fine in some applications, but is unacceptable for many. Instead of completely eliminating the redundant array, the method of the present invention uses a control circuit to power down or switch one of the redundant arrays on and off, thereby enabling a substantial reduction in the current consumption of the system when accuracy and precision are less important. Preferably, the control circuit switches off the associated analog sensor circuit in the signal processor, since the array itself is mostly a passive device that doesn't consume significant power, but the analog circuitry that is required to capture the signals coming out of the array does.

Figure 3:
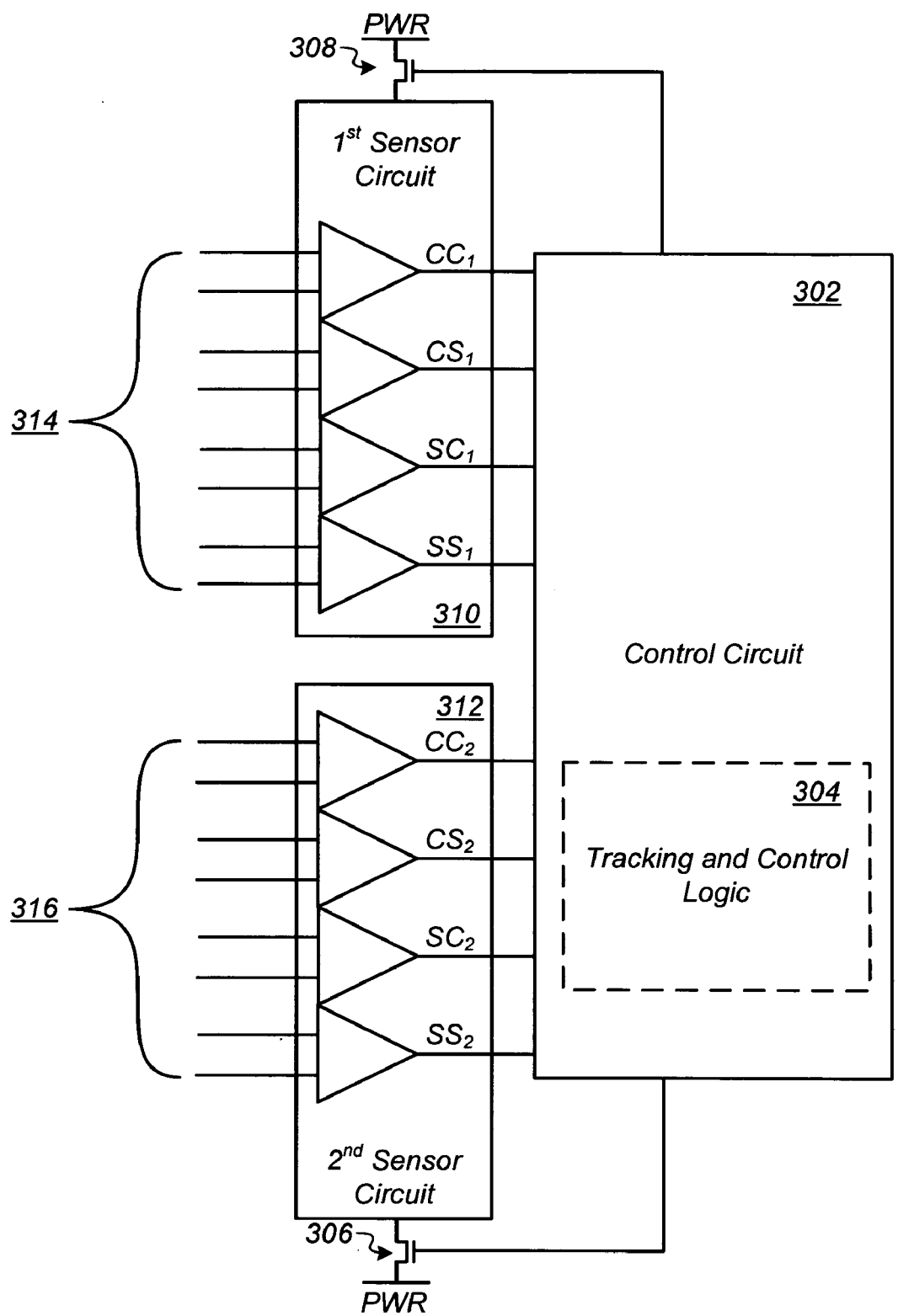
FIG. 3 is a block diagram of a circuit according to an embodiment of the present invention for reducing power consumption in an optical navigation system having redundant arrays.

A block diagram of a control circuit according to an embodiment of the present invention for reducing power consumption in an optical navigation system having redundant arrays is shown in FIG. 3. Referring to FIG. 3, the control circuit 302 includes tracking and control logic 304 coupled to a number of switching devices 306, 308, such field effect transistors or FETs, through which power is supplied to the sensor circuits 310, 312, each receiving wired-sum signals 314, 316, from one of two associated redundant arrays (not shown in this figure). The control circuit 302 is configured to switch off the analog sensor circuits 310, 312, supporting each redundant array separately. Optionally, the control circuit 302 can further be coupled to a number of additional switching devices to also switch off the redundant array associated with the sensor circuits 310 or 312 that has been or is being powered down.

Preferably, the control circuit 302 is configured to switch off power to one or both analog sensor circuits 310, 312, when no tracking is required, such as when the system is in an idle or sleep mode; to switch off only one when only average quality or gross motion detection is required; and to provide power to both sensor circuits when top performance is desired.

In certain embodiments, the decision to use or eliminate the redundancy provided by one of the redundant arrays is made when the product is designed. An example of this embodiment would be a decision made during the design of a data input device using the optical navigation system, such as an optical mouse for use with a mobile computer where battery life is more important than tracking accuracy. Examples of applications where tracking accuracy and response time override power considerations include an optical mouse for a desktop running graphics, computer aided design (CAD) or gaming programs. Advantage of this embodiment or approach include simplification of design and reduction of fabrication cost, by enabling all products or devices to share a single optical navigation system with the only difference being the programming of the configuration registers in the data input device or mouse.

In other embodiments, the decision to use or eliminate the redundancy provided by one of the redundant arrays is made dynamically during operation of a data input device using the optical navigation system. Dynamically switching off power to one of the redundant arrays and/or the associated analog circuit 310, 312, allows for a much more flexible tailoring of the system performance and power consumption.

For example, an optical mouse in an idle or sleep mode does not need to detect precise motion until a user starts moving the data input device or mouse. Up to that point the tracking performance improvements realized from a redundant array are useless. However, power savings may be very important, e.g., to extend battery life, so by turning off one of the redundant arrays power consumption is reduced without sacrificing performance. Generally, the mouse or data input device is configured to enter an idle or sleep mode after it has been stationary relative to a surface for a predetermined time. Once motion is detected using the single, powered-up array and sensor circuit 310, or 312, the control circuit 302 can restore power to the redundant array and/or the associated sensor circuit providing full or maximum system performance.

In one embodiment, the control circuit 302 may be configured to switch off both analog sensor circuits 310, 312, and/or arrays when the system is in an idle or sleep mode, thereby providing a further reduction in power consumption. The control circuit 302 can be configured to wake-up and restore power to one or both of the sensor circuits 310, 312, and arrays when movement of the data input device or mouse by the user is detected with a separate optical or mechanical sensing circuit. Alternatively, the control circuit 302 can be configured to restore power in response to input from the user, i.e., operating a switch on the mouse or other input device such as a keyboard or sensing the user's hand on the mouse. In yet another alternative embodiment, the control circuit 302 can be configured to at least partially power up and 'sample' output from one of the arrays at predetermined intervals and restore full power to one or more of the arrays only when motion is detected. Proper selection of the predetermined interval could result in substantial reduction in power consumption while also providing a sleep mode that is nearly unnoticeable to the user.

In still other embodiments, the control circuit 302 may be configured to eliminate the redundancy provided by one of the redundant arrays when only average quality or gross motion detection is desired or required, and to provide power to both sensor circuits only when top performance is desired. More preferably, the tracking and control logic 304 of the control circuit 302 is configured to measure strength of the sets of signals from each of the first and second arrays, and to dynamically switch off power to the associated analog sensor circuit 310 or 312 of the array generating the weakest signal, or when the strength of the set of signals from the other array is greater than a predetermined minimum. Optionally, the level of accuracy or performance required, and thus the predetermined minimum signal strength, may be set by the user. For example, when the optical navigation system is used in a data input device for a mobile computer, the user may be given the option of selecting a power saving mode in which the control circuit 302 switches off power to one of the redundant arrays and the associated analog sensor circuit 310, 312.

In certain embodiments, a weighted average based on the radius values (signal contrast) calculated from the two sensor circuit 310, 312, outputs is used to enable the control circuit 302 to select which of the analog sensor circuits is powered down. When a sensor circuit 310, 312, or array is powered down it will output the same or constant values for all signals coming from the associated array. These identical/constant outputs will result in a radius (signal contrast) or delta-phase (displacement) measurement of zero for the powered down sensor circuit 310, or 312. The weighted average will therefore give an output as if only the output of the powered sensor circuit 310, or 312, had been considered. This simplifies the tracking algorithm used by the tracking and control logic 304 of the control circuit 302 because it does not need to be aware of which sensor circuits are active and which are powered down.

Since the radius values, $R_x$ and $R_y$, derived from the quasi-sinusoidal signals are a good measurement of signal contrast, these values usually indicate when speckle signal fades. If $R_x$ or $R_y$ are less than an empirically determined threshold, the signal is determined to have faded. Thus, it is possible to compute average radius values from the two sensor circuits 310, 312, over a period of N frames, and use these values to decide over the next period of N frames which of the two sensor circuits should be turned on while the other sensor circuit should be turned off. Average radius values can also be used to determine if both sensor circuits 310, 312, need be turned on to avoid problems associated with signal fading from one of the arrays. Thus, the method and control circuit of the present invention provides significant reduction in power consumption while maintaining system performance, by alternating between sensor circuits 310, 312, selecting the circuit array that does not see signal fading at any given moment, and only having one sensor circuit and/or array turned on at a time.

Figure 4:
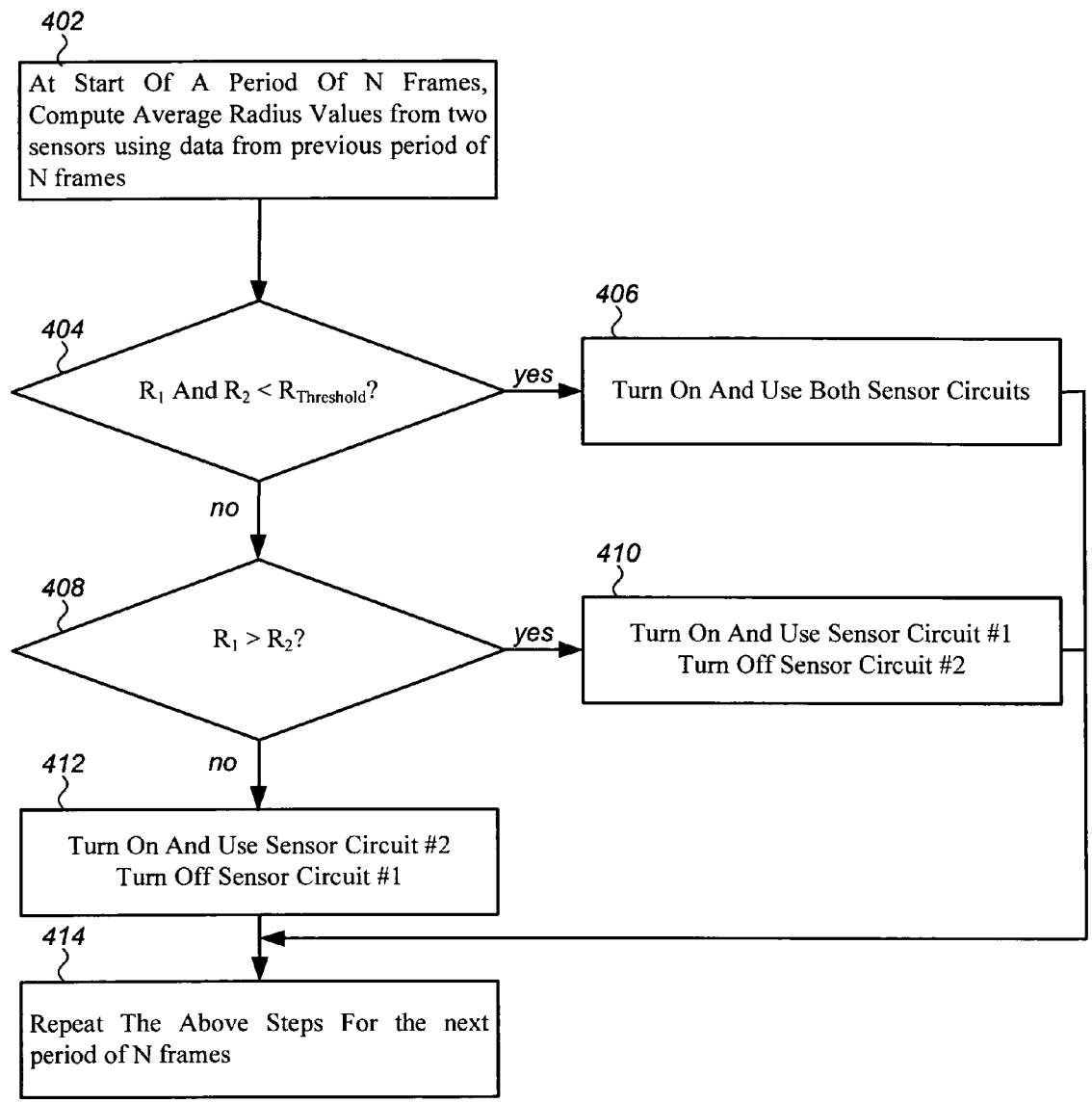
FIG. 4 is a flowchart of a method for reducing power consumption in an optical navigation system having redundant arrays according to an embodiment of the present invention.

One possible embodiment of a sensor selection algorithm or method for reducing power consumption in an optical navigation system having redundant arrays is shown in the flowchart of a FIG. 4. Referring to FIG. 4, the method begins at the start of a period of N frames, by computing average radius values from two sensor circuits using data from previous period of N frames (step 402). The average radius values, $R_1$ and $R_2$ can be computed using the following equations:

$$R_1 = \frac{1}{N}\sum_{i=1}^{N} \sqrt{(R_{x1})_i^2 + (R_{y1})_i^2} \quad (12.0)$$

and $$R_2 = \frac{1}{N}\sum_{i=1}^{N} \sqrt{(R_{x2})_i^2 + (R_{y2})_i^2} \quad (13.0)$$

where $R_{x1}$ is the radius value for motion from the first array in an x direction, $R_{y1}$ is in they direction. $R_{x2}$ and $R_{y2}$ are for radius values for motion from the second array, and i is an index that indicates the current sample frame.

Next, the computed average radius values, $R_1$ and $R_2$ are compared to a predetermined minimum value, $R_{Threshold}$, (step 404), and if both are less than $R_{Threshold}$, the control circuit turns on and uses both analog sensor circuits (step 406). If however one of the average radius values is not greater than $R_{Threshold}$, $R_1$ is compared to $R_2$ (step 408), and, if $R_1$ is greater than $R_2$, the first sensor circuit, sensor #1, is turned on and the second sensor circuit, sensor #2, is turned off (step 410). If however $R_1$ is not greater than $R_2$, the second sensor circuit, sensor #2, is turned on and the first sensor circuit, sensor #1, is turned off (step 412). The preceding steps are then repeated for the next period of N frames (step 414).

Automatic Gain Control Circuit and Method

Generally, it is desirable that the optical navigation system further include a circuit or method to control exposure of light to the optical sensor and to keep the illumination levels within a specified range. Thus, in another aspect the present invention is directed to a gain control detector or circuit or an automatic gain control (AGC) circuit 500 to adjust illumination from the illuminator of the optical navigation system.

Figure 5:
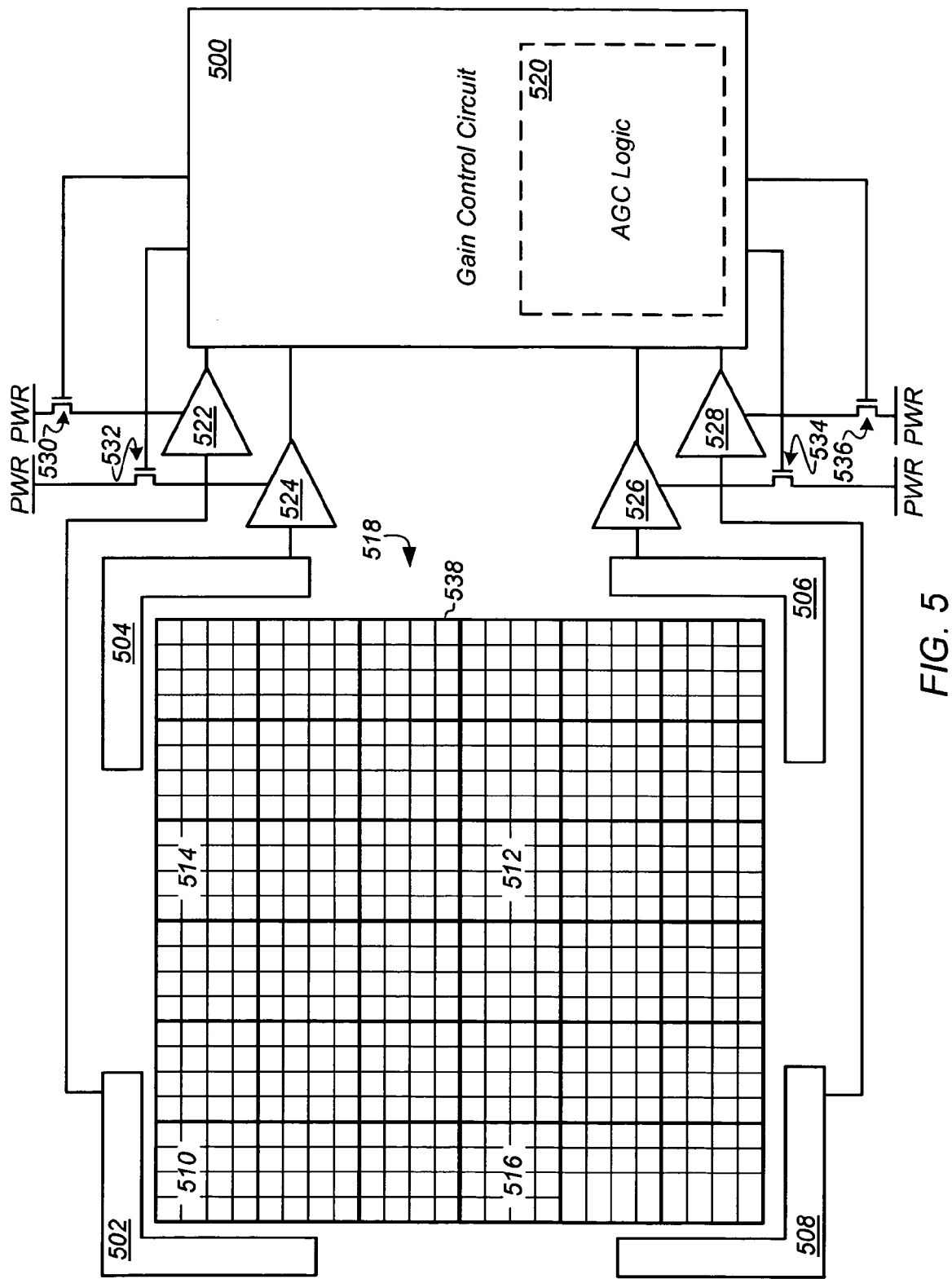
FIG. 5 is a block diagram of an automatic gain control (AGC) circuit for controlling illumination levels in an optical navigation system according to an embodiment of the present invention.

In certain embodiments, the AGC circuit 500 can take the form of one or more optical detectors 502, 504, 506, and 508, arranged around the quadrants 510, 512, 514 and 516 or array-pairs of the redundant arrays of the optical sensor 518 as shown in FIG. 5. Referring to FIG. 5, the AGC circuit 500 includes AGC logic 520, and is coupled to the optical detectors 502, 504, 506, and 508, through analog support circuits 522, 524, 526, and 528. The AGC circuit 500 is further coupled to the illuminator (not shown in this figure) or to a power supply to the illuminator to adjust the light output to keep the illumination levels within the specified range.

The AGC circuit 500 can be operated during assembly or testing of the optical navigation system or data input device to initially adjust the light output from the illuminator, and/or during operation of the device.

In one embodiment in which the AGC circuit 500 is configured to dynamically adjust light output during operation of the device, the AGC circuit further includes a number of switching devices 530, 532, 534, and 536, such as FETs, through which power is supplied to the optical detectors 502, 504, 506, and 508. Preferably, the AGC circuit is further configured to separately switch off the analog support circuits 522, 524, 526, and 528 supporting each optical detector to save power.

In some embodiments, all of optical detectors 502, 504, 506, and 508, are used to provide better control of light levels. However, as in the case of tracking, often the performance desired does not necessitate the use of all the signals at once. Thus In certain embodiments, the AGC circuit 500 may be configured to switch off all analog support circuits 522, 524, 526, and 528 and/or optical detectors 502, 504, 506, and 508, for example when the system is in an idle or sleep mode, or when the continuous monitoring of light output is not required. In particular, the signal of interest from the optical detectors 502, 504, 506, and 508, often requires a much lower sampling rate than the signal from the photosensitive elements 538 of the main optical sensor 518. In such a case, only powering analog support circuits 522, 524, 526, and 528 for these optical detectors 502, 504, 506, and 508, when data will be sampled can conserve power. For example, if a sample is only required every 10th frame, power to the analog support circuits 522, 524, 526, and 528, can be shut down for the remaining 9 frames cutting average current by 90%.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. An optical navigation system for use in an input device to sense displacement of the input device relative to a surface, the system comprising:

an optical sensor having at least a first array and a second array, each having a plurality of photosensitive elements;

imaging optics to map an illuminated portion of the surface to the optical sensor;

a signal processor including a first sensor circuit coupled to the first array and a second sensor circuit coupled to the second array to generate from each array a set of signals in response to motion of light received thereon; and a control circuit capable of independently switching power to the first and second sensor circuits to reduce power consumption in the optical navigation system.

2. An optical navigation system according to claim 1, wherein the control circuit is configured to switch off power to one of the first and second sensor circuits after the input device has been stationary relative to the surface for a predetermined time.

3. An optical navigation system according to claim 1, wherein the control circuit is configured to measure strength of the sets of signals from each of the first and second arrays.

4. An optical navigation system according to claim 3, wherein the control circuit is configured to dynamically switch power on and off to the first and second sensor circuits during operation of the optical navigation system.

5. An optical navigation system according to claim 4, wherein the control circuit is configured to automatically switch off power to one of the first and second sensor circuits when the strength of the set of signals from the other array is greater than a predetermined minimum.

6. An optical navigation system according to claim 4, wherein the control circuit is configured to switch off power to one of the first and second sensor circuits in response to a request from a user of the input device to reduce power consumption.

7. An optical navigation system according to claim 1, wherein the control circuit is further configured to switch off power to one of the first and second arrays coupled to one of the first and second sensor circuits that is switched off.

8. An optical navigation system according to claim 1, wherein the control circuit is configured to be operated during assembly of the optical navigation system to permanently switch off power to one of the first and second sensor circuits.

9. An optical navigation system according to claim 8, wherein the control circuit is further configured to permanently switch off power to the associated array.

10. An optical navigation system for use in an input device to sense displacement of the input device relative to a surface, the system comprising:

an illuminator to illuminate a portion of the surface;

an optical sensor adapted to sense motion of light received thereon;

imaging optics to map an illuminated portion of the surface to the optical sensor; and a gain control circuit including a number of photosensitive detectors and gain control logic coupled to the number of photosensitive detectors, the gain control logic configured to sample a signal from the number of photosensitive detectors and adjust illumination from the illuminator in response thereto.

11. An optical navigation system according to claim 10, further comprising a signal processor coupled to the optical sensor and configured to sample a set of signals from the optical sensor, and wherein the gain control logic is configured to sample the signal from the number of photosensitive detectors at a lower rate than the signal processor samples the set of signals from the optical sensor, thereby reducing power consumption in the optical navigation system.

12. An optical navigation system according to claim 10, wherein the number of photosensitive detectors are separate from and independent of the optical sensor.

13. An optical navigation system according to claim 12, the number of photosensitive detectors comprises a plurality of photosensitive detectors arranged around a periphery of the optical sensor.

14. An optical navigation system according to claim 12, wherein the gain control circuit is configured to be operated during assembly of the optical navigation system to permanently adjust illumination from the illuminator.

15. A method of reducing power consumption in an optical navigation system used in an input device to sense displacement of the input device relative to a surface, the method comprising steps of mapping an illuminated portion of the surface to an optical sensor having at least a first and a second array, each array having a plurality of photosensitive elements;

generating from each array a set of signals in response to motion of light received thereon using a signal processor including a first sensor circuit coupled to the first array and a second sensor circuit coupled to the second array; and switching off power to one of the first and second sensor circuits to reduce power consumption in the optical navigation system.

16. A method according to claim 15, further comprising the step of comparing strength of the sets of signals from each of the first and second arrays, prior to switching off one of the sensor circuits.

17. A method according to claim 16, wherein the step of switching off one of the first and second sensor circuits comprises the step of switching off one of the first and second sensor circuits when the strength of the set of signals from the other is greater than a predetermined minimum.

18. A method according to claim 16, wherein the step of switching off one of the first and second sensor circuits comprises the step of switching off one of the first and second sensor circuits in response to a request from a user of the input device to reduce power consumption.

19. A method according to claim 16, wherein the step of switching off one of the first and second arrays comprises the step of switching off one of the first and second sensor circuits after the input device is stationary relative to the surface for a predetermined time.

20. A method according to claim 15, further comprising the step of switching off power to the array associated with sensor circuit that is switched off.

* * * * *